United States Patent [19]
Venugopal et al.

[11] Patent Number: 5,853,916
[45] Date of Patent: *Dec. 29, 1998

[54] MULTI-LAYERED POLYMERIC GEL ELECTROLYTE AND ELECTROCHEMICAL CELL USING SAME

[75] Inventors: Ganesh Venugopal, Duluth; Anaba A. Anani, Lawrenceville, both of Ga.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 739,229

[22] Filed: Oct. 28, 1996

[51] Int. Cl.⁶ .................................................. H01M 10/40
[52] U.S. Cl. ........................................... 429/190; 429/192
[58] Field of Search ...................................... 429/190, 192

[56] References Cited

U.S. PATENT DOCUMENTS

| | | | |
|---|---|---|---|
| 5,437,692 | 8/1995 | Dasgupta et al. | 29/623.1 |
| 5,597,659 | 1/1997 | Morigaki et al. | 429/190 |
| 5,631,103 | 5/1997 | Eschbach et al. | 429/190 |
| 5,639,573 | 6/1997 | Oliver et al. | 429/190 |

OTHER PUBLICATIONS

Abraham, et al, Electrochemical Science and Technology–Polymer Electrolytes Reinforced by Celgard® Membranes, J. Electrochem. Soc. vol. 142, No. 3, Mar. 1995.

*Primary Examiner*—John S. Maples
*Attorney, Agent, or Firm*—Felipe J. Farley

[57] ABSTRACT

An electrochemical cell 10 includes first and second electrodes 12 and 14 with an electrolyte system 26 disposed therebetween. The electrolyte system includes at least a first and second layer 28 and 30, the second or gelling layer 30 being used to absorb an electrolyte active species.

58 Claims, 3 Drawing Sheets

MULTI-LAYERED POLYMERIC GEL ELECTROLYTE AND ELECTROCHEMICAL CELL USING SAME

TECHNICAL FIELD

This invention relates in general to the field of electrolytes for electrochemical cells, and more particularly to methods of making electrochemical cells using polymer gel electrolytes.

BACKGROUND OF THE INVENTION

There has been a great deal of interest in developing better and more efficient methods for storing energy for applications such as cellular communication, satellites, portable computers, and electric vehicles to name but a few. Accordingly, there have been recent concerted efforts to develop high energy, cost effective batteries having improved performance characteristics.

Rechargeable or secondary cells are more desirable than primary (nonrechargeable) cells since the associated chemical reactions which take place at the positive and negative electrodes of the battery are reversible. Electrodes for secondary cells are capable of being recharged by the application of an electrical charge thereto. Numerous advanced electrode systems have been developed for storing electrical charge. Concurrently much effort has been dedicated to the development of electrolytes capable of enhancing the capabilities and performance of electrochemical cells.

Heretofore, electrolytes have been either liquid electrolytes as are found in conventional wet cell batteries, or solid films as are available in newer, more advanced battery systems. Each of these systems have inherent limitations and related deficiencies which make them unsuitable for various applications. Liquid electrolytes, while demonstrating acceptable ionic conductivity tend to leak out of the cells into which they are sealed. While better manufacturing techniques have lessened the occurrence of leakage, cells still do leak potentially dangerous liquid electrolytes from time to time. Moreover, any leakage in the cell lessens the amount of electrolyte available in the cell, thus reducing the effectiveness of the device.

Solid electrolytes are free from problems of leakage, but, they have traditionally offered inferior properties as compared to liquid electrolytes. This is due to the fact that ionic conductivities for solid electrolytes are often one to two orders of magnitude poorer than those of liquid electrolytes. Good ionic conductivity is necessary to ensure that a battery system delivers usable amounts of power for a given application. Most solid electrolytes have not heretofore been adequate for many high performance battery systems.

One class of solid electrolytes, specifically gel electrolytes, has shown great promise for high performance battery systems. Gel electrolytes contain a significant fraction of solvents and/or plasticizers in addition to the salt and polymer of the electrolyte itself. One processing route that can be used to assemble a battery with a gel electrolyte is to leave the electrolyte salt and solvent out of the polymer gel system until after the cell is completely fabricated. Thereafter, the solvent and the electrolyte salt may be introduced into the polymer system in order to swell and activate the battery. While this approach (which is described in, for example, U.S. Pat. No. 5,456,000 issued Oct. 10, 1995) has the advantage of allowing the cell to be fabricated in a non-dry environment (the electrolyte salt in a lithium cell is typically highly hygroscopic) it offers problems with respect to performance and assembly. First, the gel electrolyte may lack sufficient mechanical integrity to prevent shorting between the electrodes while they are being bonded or laminated together with the electrolyte. The electrolyte layer thickness is reported to be 75 µm, presumably to overcome this shorting problem and to help facilitate handling of the electrolyte material. When compared to the 25 µm typical thickness for separators used in liquid lithium ion cells, this results in a significant reduction in the volumetric energy density for the cell.

Second, in order to create porosity in the electrolyte and electrode layers that will be used to absorb liquid electrolyte, a plasticizer is used. Unfortunately, the subsequent removal of this plasticizer to create the pores requires the use of flammable organic solvents. In addition to the safety hazard that is created, the time required for the solvent extraction process renders it relatively expensive. These problems are significant limitations to the successful implementation of gel electrolytes in electrochemical cells.

Successful solutions to these problems are taught in, for example, commonly-assigned U.S. Pat. No. 5,688,293 in the names of Oliver, et al., which discloses a process in which a first polymeric material is coated with layers of a second polymeric material. This process, while solving the problems described above, requires involved coating techniques which can add cost to the fabrication process.

Accordingly, there exists a need for a new electrolyte system which combines the properties of good mechanical integrity, as well as the ability to absorb sufficient amounts of an electrolyte active species so as to produce an electrolyte system with the high ionic conductivity characteristic of liquid electrolytes. The electrolyte so formed should be relatively easy to produce, without need for complex manufacturing processes.

DETAILED DESCRIPTION OF THE PREFERRED EMBODIMENT

Figure 1:
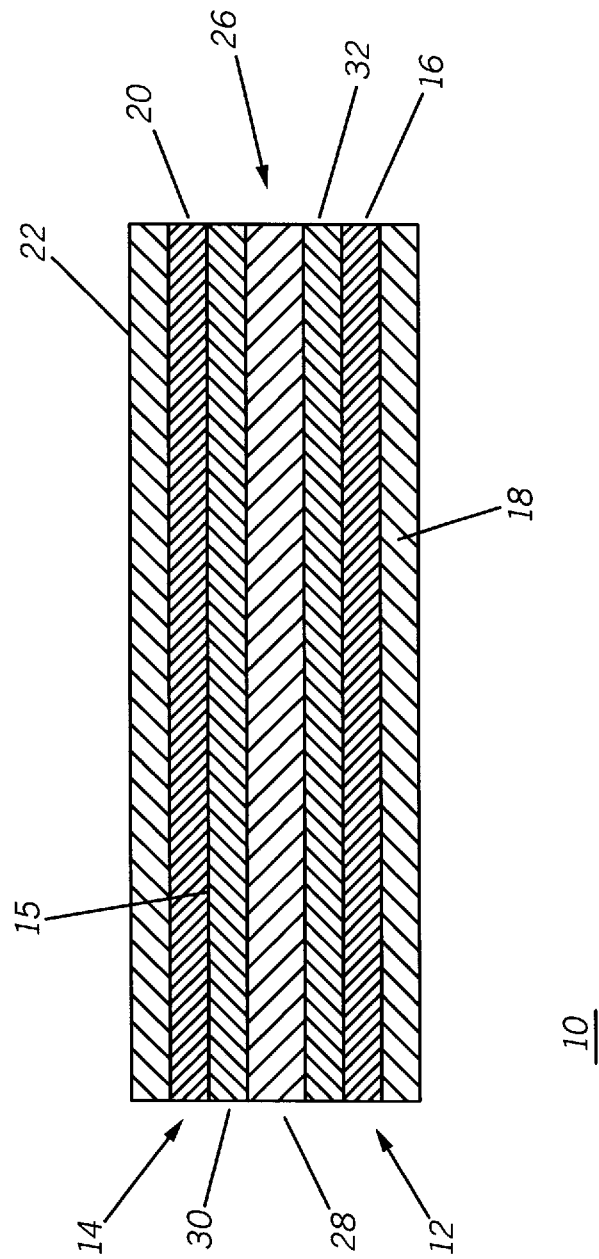
FIG. 1 is a cross sectional side view of an electrochemical cell in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a cross sectional side view of an electrochemical cell having a multi-layered electrolyte system, in accordance with the instant invention. The cell 10 includes first and second electrodes 12 and 14 respectively. The first electrode may be, for example, an anode in a lithium rechargeable cell. Accordingly, the anode may be fabricated of any of a number of different known materials for lithium rechargeable cells, examples of which include metallic lithium, lithium, lithium alloys, such as lithium: aluminum, and lithium intercalation materials such as carbon, petroleum coke, activated carbon, graphite, and other forms of carbon known in the art. In one preferred embodiment, the anode 12 is fabricated of an amorphous carbonaceous material such as that disclosed in commonly assigned U.S. Pat. No. 5,635, 151 entitled "Improved Carbon Electrode Materials For Lithium Battery Cells And Method of Making Same" filed on Nov. 22, 1995, in the names of Jinshan Zhang, et al., the disclosure of which is incorporated herein by reference.

More particularly, the anode 12 comprises a layer of active material 16 such as a carbon material as described hereinabove, deposited on a substrate 18. Substrate 18 may be any of a number of materials known in the art, examples of which include copper, gold, nickel, copper alloys, copper plated materials, and combinations thereof. In the embodiment of FIG. 1, the substrate 18 is fabricated of copper.

The second electrode 14 may be adapted to be the cathode of a lithium rechargeable cell. In such an instance, the cathode is fabricated of the lithium intercalation material such as is known in the art, examples of which include lithiated magnesium oxide, lithiated cobalt oxide, lithiated nickel oxide, and combinations thereof. In one preferred embodiment, the cathode 14 is fabricated of a lithiated nickel oxide material such as is disclosed in commonly assigned, U.S. Pat. No. 5,591,548 in the name of Zhenhua Mao filed Jun. 5, 1995, the disclosure of which is incorporated herein by reference.

More particularly, the cathode 14 comprises a layer of the cathode active material 20 disposed on a cathode substrate 22. The cathode material 20 may be such as that described hereinabove, while the substrate may be fabricated from any of a number materials known in the art, examples of which include aluminum, nickel, and combinations thereof. In one preferred embodiment, substrate 22 is fabricated of aluminum.

Disposed between electrodes 12 and 14 is a multi-layer electrolyte material system 26. The electrolyte system 26 comprises an electrolyte active species and a multi-layered polymer gel electrolyte support structure consisting of at least two different polymers. The polymer gel electrolyte support structure standing alone, i.e., without the addition of the electrolyte active species, may be employed as the separator in an electrochemical cell. A first polymer is provided as an inert, microporous, non-gelling polymeric carrier layer, and the second polymer is provided as a porous, absorbing, gelling polymeric carrier layer. The first polymeric electrolyte carrier layer 28 is provided to give mechanical integrity and structural rigidity to the electrolyte system thereby preventing electrical shorting of the two electrodes. The second, gelling polymeric carrier layers 30, 32, which may be disposed on either or both sides of the inert layer, are adapted to engage the electrolyte active species therein. Moreover, if the second polymer is disposed on both sides of the first polymeric material, the polymer selected for use may be different on each side of the first polymeric carrier layer. It is also important to note that, in contradistinction to many prior attempts to fabricate a gel electrolyte, the multi-layered structure of this electrolyte system is comprised of a plurality of discrete polymeric layers stacked one atop the other, as opposed to one polymer being impregnated or absorbed into a second polymer.

The electrolyte active species is a liquid or solid component (or both) which provides ionic conductivity between the anode and the cathode. In the embodiment in which the electrochemical cell 10 is a lithium intercalation cell, the electrolyte active species consists of an alkali metal salt in a solvent. Typical alkali metal salts include, but are not limited to, salts having the formula $M^+X^-$ where $M^+$ is an alkali metal cation such as $Li^+$, $Na^+$, $K^+$, and combinations thereof; and $X^-$ is an anion such as $Cl^-$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $N(CF_3SO_2)2^-$, $C(CF_3SO_2)_2^-$ and combinations thereof. The solvent into which the salt is dispersed is typically an organic solvent including, but not limited to, propylene carbonate (PC), ethylene carbonate (EC), diethyl carbonate (DEC), dimethyl carbonate (DMC), dipropylcarbonate, dimethylsulfoxide, acetonitrile, dimethoxyethane, tetrahydrofuran, n-methyl-2-pyrrolidone (NMP), acetone and combinations thereof. For other electrode combinations, i.e., Ni—Cd or Ni-metal hydride, other electrolyte active species may be used, such as KOH.

Figure 2:
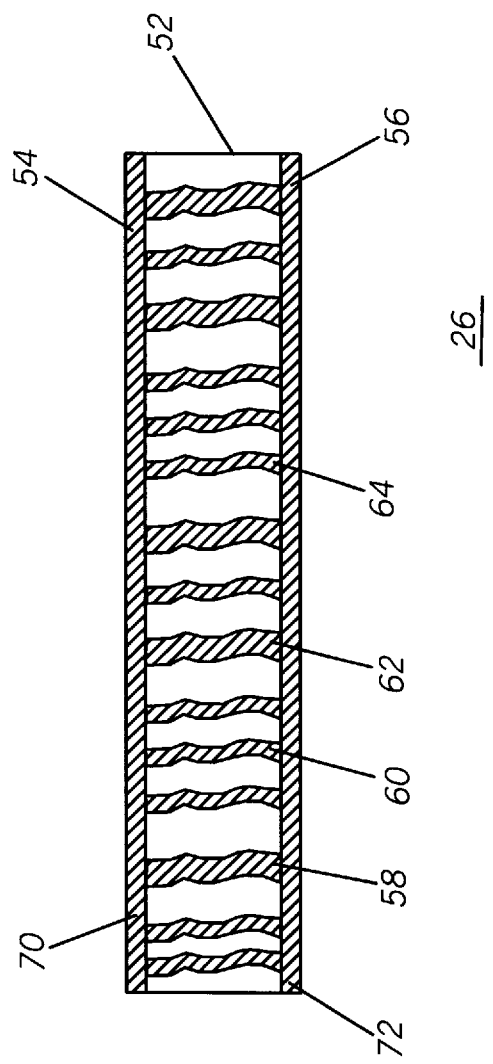
FIG. 2 is a cross-sectional side view of an electrolyte layer for use with an electrochemical cell, in accordance with the invention.

Referring now to FIG. 2, there is illustrated therein a cross-sectional side view of the electrolyte system 26 of FIG. 1. The electrolyte system 26 comprises a discrete first polymeric electrolyte carrier layer 52, which is a porous separator formed of a layer of inert polymer material. The term "inert" refers to the fact that the material itself is not absorbing, though the layer of material, due to its porosity (as described below) may be wettable, or absorbing. Further, the polymeric material is substantially non-gelling: That is, the polymer will not form a gel in the presence of one or more solvent materials used in electrochemical cells. The discrete, first polymeric electrolyte carrier material may be fabricated or selected from the group of materials consisting of polyalkenes such as polyethylene, polypropylene, polytetrafluroethylene, polyethyleneterephthalate, polystyrene, ethylene propylene diene monomer, nylon, and combinations thereof.

Layer 52 further includes first and second major surfaces 54 and 56, respectively. Layer 52 is preferably be fabricated of polyethylene or polypropylene and is a highly porous layer having a plurality of pores, for example, 58, 60, 62 and 64 formed therein and therethrough. The porosity of layer 52 is typically on the order of between 20 and 80%, and preferably between about 28 and 50%. As layer 52 is a layer of inert polymeric material, it is provided to enhance the mechanical strength or integrity of the polymer electrolyte system.

In a second embodiment, layer 52 is itself a multi-layered structure which possesses all of the characteristics described above. In this regard, the layer may be fabricated of, for example, the polymeric materials described above. In one preferred embodiment, the multi-layered first polymeric structure may be fabricated of a so-called "shut-down" polymeric system. In such a system, when internal electrochemical cell temperature exceeds a threshold temperature, the polymers melt completely, effectively shutting down the electrochemical reaction, and hence all battery operation. In this regard, the multi-layered first polymeric layer may be fabricated of a layer of polyethylene sandwiched between two layers of polypropylene.

Disposed on at least one of the first and second major surfaces, 54, 56 is a layer of a second, porous, gelling, polymeric electrolyte carrier material adapted to absorb the electrolyte active species. The absorbing or gel-forming polymer may be selected from the group of polymers, including polyvinylidene fluoride (PVDF), polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof. As illustrated in FIG. 2, the layer of the second polymeric material 70 is disposed on surface 54 of layer 52. A second layer 72 of a second polymeric material may be disposed on the second major surface 56 of layer 52. The layers of gel forming polymer 70, 72 may be fabricated of the same or different materials, as described hereinabove.

It is also to be noted that the layers of polymeric material described above are all discrete layers which are stacked one atop the other into a layered structure. The layers may then be laminated into a unitary structure and subsequently disposed between opposing electrodes. Alternatively, the layers may simply be stacked adjacent one another, and between the electrodes, after which all the components are laminated and wound into an electrochemical cell. The exact preferred assembly method will depend on the particular materials selected for use in the system. It is important to note that the liquid electrolyte is going to be dispersed in all the layers of the multilayer polymeric separator, however after the gelation step, the liquid electrolyte forms a gel with the second, "gellable" layer but remains a liquid in the first "non-gellable" layer.

The electrodes and separator materials described above may be fabricated into electrochemical cells by winding and/or stacking the layers of electrode and separator material. Discrete cells are then packaged between sheets of a vapor impermeable package. More particularly, discrete cell, is packaged between sheets of water vapor impermeable material such as metal foil laminates. Sheets enclose the discrete package, or cell. The package is sealed and thereafter, the electrolyte active material, as described above, is injected into the sealed package.

The battery cell is then cured by exposing it both to a compression and heating step. More particularly, the packaged discrete battery cell is exposed to a temperature of between 50° and 150° C. for a period of time between 6 and 3600 seconds. The exact time will depend on the size of the cells themselves. The compression force used to seal and cure and battery pack is on the order of between 1 and 500 lbs/cm$^2$ and preferably between 50 and 100 lbs/cm$^2$. This heating and pressing step results in the absorbing polymer material being dissolved, along with the liquid electrolyte active species, which seeps or is forced into the pores of the inert polymer. When the cell cools and solidifies, or gels, it serves the additional function of adhering the layers of electrode material to the separator.

The invention may be better understood from a perusal of the examples of which are attached hereto.

EXAMPLE

A 50 mAh capacity flat cell was constructed in which the electrodes were separated by three layers of free standing polymeric carrier materials. Lithium cobalt oxide (LiCoO$_2$) was used as the active material in the cathode, while graphite (SFG$_{44}$) was the active material in the anode. Liquid electrolyte, comprising a 1M solution of lithium hexafluorophosphate (LiPF$_6$) in a mixture containing 40:60 by weight ratio of ethylene carbonate (EC) and diethyl carbonate (DEC), was added to the cell during the stacking operation. The polymeric separator system comprised a first layer of polypropylene sandwiched between layers of polyvinylidene fluoride (PVDF).

Figure 3:
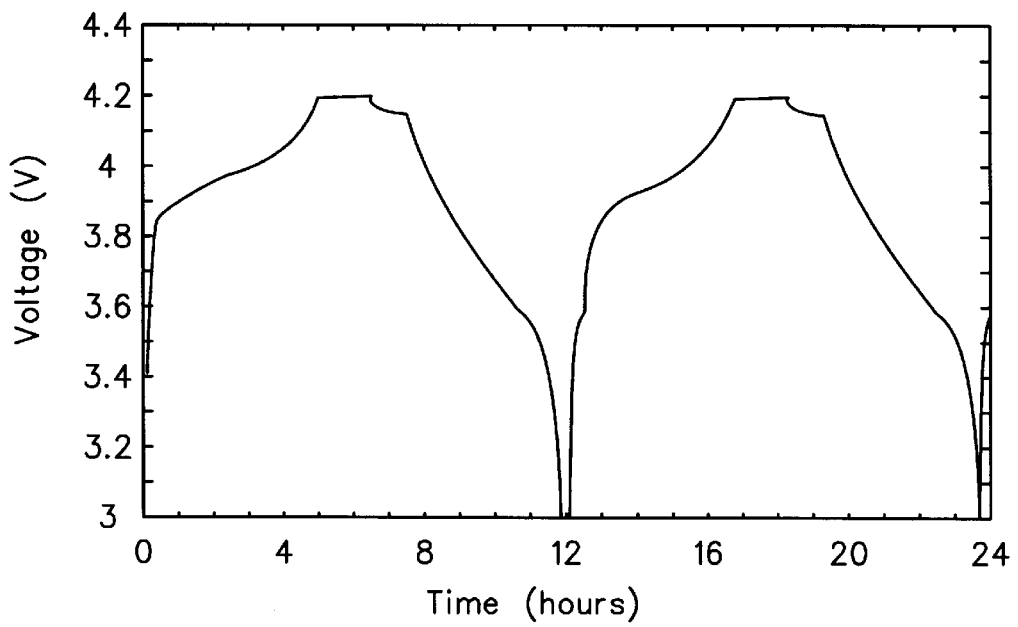
FIG. 3 is a charge/discharge profile for an electrochemical cell, in accordance with the instant invention.
Figure 4:
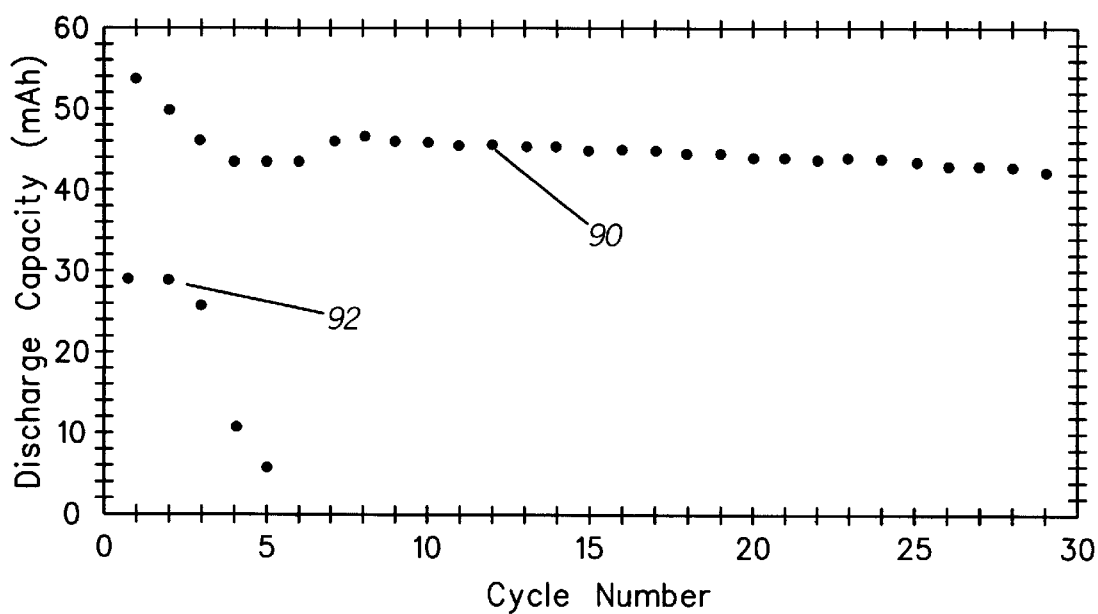
FIG. 4 is a chart illustrating discharge capacity for an electrochemical cell, in accordance with the instant invention.

The cell was packaged in an aluminum foil laminate pouch, gelled for 2 minutes at 90° C. and then cooled to room temperature, between two stainless steel plates. The cell was cycled using the protocol setup for cycling standard 50 mAh labsize flat cells. FIG. 3 shows the charge-discharge voltage profile of the cell for the first two cycles and suggests good active material utilization, the first cycle discharge being about 54 mAh. The first cycle efficiency was around 77%. FIG. 4 shows a capacity vs. cycle number plot for the cell. After a small capacity loss that occurred during the first couple of cycles, the discharge capacity of the cell seems to have stabilized around the 46 mAh area.

The cycling data indicates that cells containing separators comprising multiple layers of free standing films performed very well. The PVDF interlayers effect the cell performance in a positive manner, as can be seen by comparing line 90 of FIG. 4 with the cycle life plot line 92, of a cell containing no PVDF interlayers. Cells without the interlayer fade much more rapidly than cells with the interlayer. Furthermore, the cell without the interlayers utilizes only a portion of the active material in the cell. Hence the initial discharge capacity in FIG. 4 is only around 30 mAh instead of the expected 50 mAh.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrolyte system for an electrochemical cell, comprising:

a discrete, first electrolyte polymeric carrier layer which comprises a plurality of sublayers, is non-gelling, and having first and second major surfaces;

a discrete second electrolyte polymeric carrier layer which is substantially gelling, and is disposed on at least one of said first and second major surfaces of said first electrolyte carrier layer; and an electrolyte active species dispersed throughout at least said discrete second electrolyte layer wherein the gelling layer is not present in the non-gelling layer.

2. An electrolyte system as in claim 1, wherein said discrete second electrolyte carrier layer is disposed on both said first and second major surfaces of said first electrolyte carrier layer.

3. An electrolyte system as in claim 1, wherein the discrete second polymeric carrier layer disposed on the first major surface is different than the discrete second polymeric carrier disposed on the second major surface.

4. An electrolyte system as in claim 1, wherein said discrete first polymeric carrier layer is fabricated of a material selected from the group of polypropylene, polyethylene, polytetrafluroethylene, polyethyleneterephthalate, polystyrene, ethylene propylene diene monomer, nylon, and combinations thereof.

5. An electrolyte system as in claim 1, wherein said discrete second polymeric carrier layer is fabricated of a material selected from the group of polyvinylidene fluoride, polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof.

6. An electrolyte system as in claim 1, wherein said first electrolyte polymeric carrier layer comprises three sublayers.

7. An electrolyte system as in claim 1, wherein said discrete first electrolyte polymeric carrier layer comprises a layer of polyethylene sandwiched between two layers of polypropylene.

8. An electrolyte system as in claim 1, wherein said discrete first electrolyte polymeric carrier layer is fabricated of polypropylene, and said second electrolyte polymeric carrier layer is fabricated of polyvinylidene fluoride.

9. An electrolyte system as in claim 1, wherein said electrolyte active species comprises an electrolyte salt dispersed in an organic solvent.

10. An electrolyte system as in claim 9, wherein said organic solvent is selected from the group consisting of propylene carbonate, ethylene carbonate, diethyl carbonate, dimethyl carbonate, dipropylcarbonate, dimethylsulfoxide, acetonitrile, dimethoxyethane, tetrahydrofuran, n-methyl-2-pyrrolidone, and combinations thereof.

11. An electrolyte system as in claim 9, wherein said electrolyte salt is selected from the group consisting of $Cl^-$, $Br^-$, $I^-$, $ClO_4^-$, $BF_4^-$, $PF_6^-$, $ASF_6^-$, $SbF_6^-$, $CH_3CO_2^-$, $CF_3SO_3^-$, $N(CF_3SO_2)_2^-$, $C(CF_3SO_2)_2^-$ and combinations thereof.

12. An electrolyte system for an electrochemical cell, comprising a multi-layered structure including a non-gelling, discrete, first electrolyte polymeric carrier layer comprising a plurality of sublayers, and sandwiched between first and second layers of a gelling, discrete second electrolyte polymeric carrier layer and at least said gelling layers having an electrolyte active species dispersed therein; wherein the gelling layer is not present in the non-gelling layer.

13. An electrolyte system as in claim 12, wherein the first and second discrete second polymeric carrier layers are fabricated of different materials.

14. An electrolyte system as in claim 12, wherein said discrete first polymeric carrier layer is fabricated of a material selected from the group of polypropylene, polyethylene, polytetrafluroethylene, polyethyleneterephthalate, polystyrene, ethylene propylene diene monomer, nylon, and combinations thereof.

15. An electrolyte system as in claim 12, wherein said discrete second polymeric carrier layer is fabricated of a material selected from the group of polyvinylidene fluoride, polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof.

16. An electrolyte system as in claim 12, wherein said first electrolyte polymeric carrier layer comprises three sublayers.

17. An electrolyte system as in claim 12, wherein said discrete first electrolyte polymeric carrier layer comprises a layer of polyethylene sandwiched between two layers of polypropylene.

18. An electrolyte system as in claim 12, wherein said discrete first electrolyte polymeric carrier layer is fabricated of polypropylene, and said second electrolyte polymeric carrier layer is fabricated of polyvinylidene fluoride.

19. Ail electrolyte system as in claim 12, wherein said electrolyte active species comprises an electrolyte salt dispersed in an organic solvent.

20. An electrolyte system as in claim 19, wherein said organic solvent is selected from the group consisting of propylene carbonate, ethylene carbonate, diethyl carbonate, dimethyl carbonate, dipropylcarbonate, dimethylsulfoxide, acetonitrile, dimethoxyethane, tetrahydrofuran, n-methyl-2-pyrrolidone, and combinations thereof.

21. An electrolyte system as in claim 19, wherein said electrolyte salt is selected from the group consisting of $Cl^-$, $Br^-$, $I^-$, $ClO_4^-$, $BF_4^-$, $PF_6^-$, $ASF_6^-$, $SbF_6^-$, $CH_3CO_2^-$, $CF_3SO_3^-$, $N(CF_3SO_2)_2^-$, $C(CF_3SO_2)_2^-$ and combinations thereof.

22. An electrochemical cell, comprising:
an anode;
a cathode; and
an electrolyte system including a multi-layered structure having a non-gelling, discrete, first electrolyte polymeric carrier layer comprising a plurality of sublayers and sandwiched between first and second layers of a gelling, discrete second electrolyte polymeric carrier layer and at least said gelling layers having an electrolyte active species dispersed therein wherein the gelling layer is not present in the non-gelling layer.

23. An electrochemical cell as in claim 22, wherein the first and second discrete second polymeric carrier layers are fabricated of different materials.

24. An electrochemical cell as in claim 22, wherein said discrete first polymeric carrier layer is fabricated of a material selected from the group of polypropylene, polyethylene, polytetrafluroethylene, polyethyleneterephthalate, polystyrene, ethylene propylene diene monomer, nylon, and combinations thereof.

25. An electrochemical cell as in claim 22, wherein said discrete second polymeric carrier layer is fabricated of a material selected from the group of polyvinylidene fluoride, polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof.

26. An electrochemical cell as in claim 22, wherein said first electrolyte polymeric carrier layer comprises three sublayers.

27. An electrochemical cell as in claim 22, wherein said discrete first electrolyte polymeric carrier layer comprises a layer of polyethylene sandwiched between two layers of polypropylene.

28. An electrochemical as in claim 22, wherein said discrete first electrolyte polymeric carrier layer is fabricated of polypropylene, and said second electrolyte polymeric carrier layer is fabricated of polyvinylidene fluoride.

29. An electrochemical cell as in claim 22, wherein said electrolyte active species comprises an electrolyte salt dispersed in an organic solvent.

30. An electrochemical cell as in claim 29, wherein said organic solvent is selected from the group consisting of propylene carbonate, ethylene carbonate, diethyl carbonate, dimethyl carbonate, dipropylcarbonate, dimethylsulfoxide, acetonitrile, dimethoxyethane, tetrahydrofuran, n-methyl-2-pyrrolidone, and combinations thereof.

31. An electrochemical cell as in claim 29, wherein said electrolyte salt is selected from the group consisting of $Cl^-$, $Br^-$, $I^-$, $ClO_4^-$, $BF_4^-$, $PF_6^-$, $ASF_6^-$, $SbF_6^-$, $CH_3CO_2^-$, $CF_3SO_3^-$, $N(CF_3SO_2)_2^-$, $C(CF_3SO_2)_2^-$ and combinations thereof.

32. An electrochemical cell as in claim 22, wherein said anode is fabricated of a carbon based material.

33. An electrochemical cell as in claim 22, wherein said cathode is fabricated of a lithiated transition metal oxide.

34. An electrolyte separator system for an electrochemical cell, comprising:
a discrete, first electrolyte polymeric carrier layer which is non-gelling and comprising a plurality of sublayers, and having first and second major surfaces; and
a discrete second electrolyte polymeric carrier layer which is gelling, and is disposed on at least one of said first and second major surfaces of said first electrolyte carrier layer wherein the gelling layer is not present in the non-gelling layer.

35. An electrolyte separator system as in claim 34, wherein said discrete second electrolyte carrier layer is disposed on both said first and second major surfaces of said first electrolyte carrier layer.

36. An electrolyte separator system as in claim 34, wherein the discrete second polymeric carrier layer disposed on the first major surface is different than the discrete second polymeric carrier disposed on the second major surface.

37. An electrolyte separator system as in claim 34, wherein said discrete first polymeric carrier layer is fabricated of a material selected from the group of polypropylene, polyethylene, polytetrafluroethylene, polyethyleneterephthalate, polystyrene, ethylene propylene diene monomer, nylon, and combinations thereof.

38. An electrolyte separator system as in claim 34, wherein said discrete second polymeric carrier layer is fabricated of a material selected from the group of polyvinylidene fluoride, polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof.

39. An electrolyte separator system as in claim 34, wherein said first electrolyte polymeric carrier layer comprises three sublayers.

40. An electrolyte separator system as in claim 34, wherein said discrete first electrolyte polymeric carrier layer comprises a layer of polyethylene sandwiched between two layers of polypropylene.

41. An electrolyte separator system as in claim 34, wherein said discrete first electrolyte polymeric carrier layer is fabricated of polypropylene, and said second electrolyte polymeric carrier layer is fabricated of polyvinylidene fluoride.

42. An electrolyte system for an electrochemical cell comprising a multilayered structure including a discrete, first electrolyte polymeric carrier layer that is non-gelling and that is sandwiched between discrete second and third electrolyte polymeric carrier layers that are gelling, said second and third layers comprising polyvinylidene fluoride and having an electrolyte species dispersed therein wherein the gelling layer is not present in the non-gelling layer.

43. An electrolyte system as in claim 42, wherein said discrete first polymeric carrier layer is fabricated of a material selected from the group of polypropylene, polyethylene, polytetrafluroethylene, polyethyleneterephthalate, polystyrene, ethylene propylene diene monomer, nylon, and combinations thereof.

44. An electrolyte system as in claim 42, wherein the discrete, first electrolyte polymeric carrier layer comprises a plurality of sublayers.

45. An electrolyte system as in claim 42, wherein said first electrolyte polymeric carrier layer comprises three sublayers.

46. An electrolyte system as in claim 42, wherein said discrete first electrolyte polymeric carrier layer comprises a layer of polyethylene sandwiched between two layers of polypropylene.

47. An electrolyte system as in claim 42, wherein said electrolyte active species comprises an electrolyte salt dispersed in an organic solvent.

48. An electrolyte system as in claim 47, wherein said organic solvent is selected from the group consisting of propylene carbonate, ethylene carbonate, diethyl carbonate, dimethyl carbonate, dipropylcarbonate, dimethylsulfoxide, acetonitrile, dimethoxyethane, tetrahydrofuran, n-methyl-2-pyrrolidone, and combinations thereof.

49. (Amended) An electrolyte system as in claim 47, wherein said electrolyte salt is selected from the group consisting of $Cl^-$, $Br^-$, $I^-$, $ClO_4^-$, $BF_4^-$, $PF_6^-$, $ASF_6^-$, $SbF_6^-$, $CH_3CO_2^-$, $CF_3SO_3^-$, $N(CF_3SO_2)_2^-$, $C(CF_3SO_2)_2^-$ and combinations thereof.

50. An electrochemical cell, comprising:

an anode;

a cathode; and an electrolyte system including a multi-layered structure having a discrete, first electrolyte polymeric carrier layer that is substantially non-gelling and that is sandwiched between second and third electrolyte polymeric carrier layers that are substantially gelling and are fabricated of polyvinylidene fluoride, said gelling layer that include an electrolyte active species dispersed therein wherein the gelling layer is not present in the non-gelling layer.

51. An electrochemical cell as in claim 50, wherein the discrete, first electrolyte polymeric carrier layer comprises a plurality of sublayers.

52. An electrochemical cell as in claim 50, wherein said first electrolyte polymeric carrier layer comprises three sublayers.

53. An electrochemical cell as in claim 50, wherein said discrete first electrolyte polymeric carrier layer comprises a layer of polyethylene sandwiched between two layers of polypropylene.

54. An electrochemical cell as in claim 50, wherein said electrolyte active species comprises an electrolyte salt dispersed in an organic solvent.

55. An electrochemical cell as in claim 54, wherein said organic solvent is selected from the group consisting of propylene carbonate, ethylene carbonate, diethyl carbonate, dimethyl carbonate, dipropylcarbonate, dimethylsulfoxide, acetonitrile, dimethoxyethane, tetrahydrofuran, n-methyl-2-pyrrolidone, and combinations thereof.

56. An electrochemical cell as in claim 54, wherein said electrolyte salt is selected from the group consisting of $Cl^-$, $Br^-$, $I^-$, $ClO_4^-$, $BF_4^-$, $PF_6^-$, $ASF_6^-$, $SbF_6^-$, $CH_3CO_2^-$, $CF_3SO_3^-$, $N(CF_3SO_2)_2^-$, $C(CF_3SO_2)_2^-$ and combinations thereof.

57. An electrochemical cell as in claim 50, wherein said anode is fabricated of a carbon based material.

58. An electrochemical cell as in claim 50, wherein said cathode is fabricated of a lithiated transition metal oxide.

* * * * *